(12) United States Patent
Cannon et al.

(10) Patent No.: US 7,885,781 B2
(45) Date of Patent: *Feb. 8, 2011

(54) ACQUIRING TEST DATA FROM AN ELECTRONIC CIRCUIT

(75) Inventors: Todd A. Cannon, Rochester, MN (US); William J. Csongradi, Jr., Rochester, MN (US); Roger J. Gravrok, Eau Claire, WI (US); David L. Pease, Rochester, MN (US); Ryan J. Schlichting, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 188 days.

This patent is subject to a terminal disclaimer.

(21) Appl. No.: 12/166,807

(22) Filed: Jul. 2, 2008

(65) Prior Publication Data

US 2008/0315898 A1  Dec. 25, 2008

Related U.S. Application Data

(63) Continuation of application No. 11/766,145, filed on Jun. 21, 2007, now Pat. No. 7,398,174, which is a continuation of application No. 11/335,768, filed on Jan. 19, 2006, now Pat. No. 7,383,146.

(51) Int. Cl.
  *G01R 31/00* (2006.01)
  *G01R 31/14* (2006.01)
(52) U.S. Cl. .................................................. 702/117
(58) Field of Classification Search .................. 702/66, 702/67, 117, 118, 121, 122, 127, 89, 188; 324/72.5, 754, 759; 714/25
See application file for complete search history.

(56) References Cited

U.S. PATENT DOCUMENTS

| 5,144,225 | A | * | 9/1992 | Talbot et al. | 324/73.1 |
|---|---|---|---|---|---|
| 5,349,543 | A | | 9/1994 | Buliszyn et al. | |
| 6,760,677 | B2 | * | 7/2004 | Tanizume | 702/89 |
| 6,836,747 | B2 | * | 12/2004 | Suzuki | 702/178 |
| 7,298,869 | B1 | * | 11/2007 | Abernathy | 382/108 |

(Continued)

FOREIGN PATENT DOCUMENTS

JP  06-233829  *  8/1994

OTHER PUBLICATIONS

English translation of JP 06-233829, Aug. 1994.*

*Primary Examiner*—Michael P Nghiem
(74) *Attorney, Agent, or Firm*—Biggers & Obanian LLP

(57) ABSTRACT

Methods, systems, and computer program products are disclosed for acquiring test data from an electronic circuit by mounting a probe adjacent to a capture point on an electronic circuit board, capturing by the probe an electronic signal of the electronic circuit, digitizing by the probe the captured signal, and transmitting by the probe the digitized signal from the probe through a data communications connection to a remote device. Acquiring test data from an electronic circuit also includes storing by the probe the digitized signal in the probe. Acquiring test data from an electronic circuit may include processing by the probe the digitized signal. Acquiring test data from an electronic circuit also may include synchronizing acquisition of test data by the probe with acquisition of test data by one or more other probes.

8 Claims, 6 Drawing Sheets

U.S. PATENT DOCUMENTS

| | | | |
|---|---|---|---|
| 7,346,133 B2 * | 3/2008 | Tatem, Jr. | 375/344 |
| 7,383,146 B2 * | 6/2008 | Cannon et al. | 702/117 |
| 7,398,174 B2 * | 7/2008 | Cannon et al. | 702/117 |
| 7,536,280 B2 * | 5/2009 | Bingham et al. | 702/189 |
| 2003/0038626 A1 | 2/2003 | Carrington et al. | |
| 2004/0113790 A1 * | 6/2004 | Hamel et al. | 340/572.1 |
| 2006/0215167 A1 * | 9/2006 | O'Gorman et al. | 356/454 |
| 2006/0277384 A1 | 12/2006 | Yagawa et al. | |
| 2007/0168147 A1 | 7/2007 | Cannon et al. | |
| 2007/0244661 A1 * | 10/2007 | Cannon et al. | 702/117 |
| 2008/0042666 A1 * | 2/2008 | Sullivan | 324/754 |
| 2008/0234966 A1 * | 9/2008 | Cannon et al. | 702/117 |

* cited by examiner

ACQUIRING TEST DATA FROM AN ELECTRONIC CIRCUIT

CROSS-REFERENCE TO RELATED APPLICATION

This application is a continuation application of and claims priority from application Ser. No. 11/766,145 now U.S. Pat. No. 7,398,174, filed on Jun. 21, 2007, which is a continuation application of and claims priority from application Ser. No. 11/335,768 now U.S. Pat. No. 7,383,146, filed on Jan. 19, 2006.

BACKGROUND OF THE INVENTION

1. Field of the Invention

The field of the invention is data processing, or, more specifically, methods, systems, and products for acquiring test data from an electronic circuit.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

To continue the development of these powerful computer systems and maintain current computer systems, electronics technicians require powerful tools for testing electronic circuits. Testing is the analysis of defects in the operation of electronic circuits and the optimization of performance of electronic circuits. Testing electronic circuits often involves connecting oscilloscope to an electronic circuit board to enable the observation and characterization of the electronic signals of an electronic circuit of the electronic circuit board.

Testing electronic circuits with an oscilloscope, however, has certain disadvantages. To test electronic circuits through an electronics circuit board, an electronics technician may manually connect the oscilloscope to an electronic circuit board using oscilloscope probes. When an electronics technician manually holds oscilloscope probes against an electronic circuit board, unreliable measurements are often produced because of a poor connection between the oscilloscope probe and the electronic circuit board. In addition, manual probing may even be impossible when the electronic circuit board is located in a physically inaccessible area.

As an alternative to manual probing, an electronics technician may attach oscilloscope probes to an electronic circuit board using a 'probe adapter.' An electronics technician often manually solders the probe adapter to the electronic circuit board for testing. The oscilloscope probes then connect to the probe adapter through a receptacle. An electronic technician must create each probe adapter, map each probe adapter attachment point to the electronic circuit board from a schematic diagram of the electronic circuit board, and solder each probe adapter individually to the electronic circuit board. Creating, mapping, and soldering each probe adapter is time-consuming and conducive to error.

When an electronics technician establishes a connection between the oscilloscope and the circuit board, the physical size of each probe adapter relative to the footprints of most electronic components often allows for only a limited number of adapters to be simultaneously connected to a particular electronic component on an electronic circuit board. Often the number of adapters that can be simultaneously connected to a particular electronic component is far less than the number of electronic circuits that an electronics technician needs to simultaneously test. For example, a typical dynamic random access memory ('DRAM') module may require an electronics technician to test up to twenty electronic circuits, while physical limitations of the DRAM module may only allow an electronics technician to only place four probe adapters in the vicinity of the DRAM module.

Other problems testing electronic circuits with an oscilloscope and probe adapters also exist. Oscilloscopes are typically limited to a small number of channels, each channel capable of testing one electronic signal of an electronic circuit. An electronics technician must therefore move the oscilloscope probes many times in order to test a large number of electronic signals. Moving oscilloscope probes by engaging and disengaging the oscilloscope probes from a probe adapter produces mechanical stresses that may cause the connections between the oscilloscope probe, the probe adapter, and the electronic circuit board to fail. A failed connection may produce unreliable measurements of the electronic signal or not produce any measurements at all.

Additional problems when testing electronic circuits with oscilloscopes arise from the oscilloscope cable that connects the oscilloscope and the oscilloscope probes. Typical oscilloscope cables range from two to three feet and forces close proximity of the oscilloscope to the oscilloscope probes connected to the circuit board. Testing an electronic circuit board buried deep inside a computer chassis may be difficult or impossible when the distance between the oscilloscope and the electronic circuit board is greater than the length of the oscilloscope cables. When a connection is possible, parasitic electronic signals entering the oscilloscope cable from the debugging environment may cause degradation of the electronic signal under test.

SUMMARY OF THE INVENTION

Methods, system, and computer program products are disclosed for acquiring test data from an electronic circuit by mounting a probe adjacent to a capture point on an electronic circuit board, the electronic circuit board having an electronic circuit, capturing by the probe an electronic signal of the electronic circuit, digitizing by the probe the captured signal, and transmitting by the probe the digitized signal from the probe through a data communications connection to a remote device. Acquiring test data from an electronic circuit also may include storing by the probe the digitized signal in the probe. Acquiring test data from an electronic circuit also may include processing by the probe the digitized signal. Acquiring test data from an electronic circuit also may include synchronizing acquisition of test data by the probe with acquisition of test data by one or more other probes.

Acquiring test data from an electronic circuit also may include synchronizing acquisition of test data by the probe with acquisition of test data by one or more other probes, including providing from the remote device through the data communications connection to such synchronized probes a synchronization clock signal. Acquiring test data from an electronic circuit also may include synchronizing acquisition of test data by the probe with acquisition of test data by one or more other probes, receiving in the remote device through the data communications connection digitized signals captured and transmitted from two or more such synchronized probes, synchronizing by the remote device the received signals for display, and displaying by the remote device the synchronized signals.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
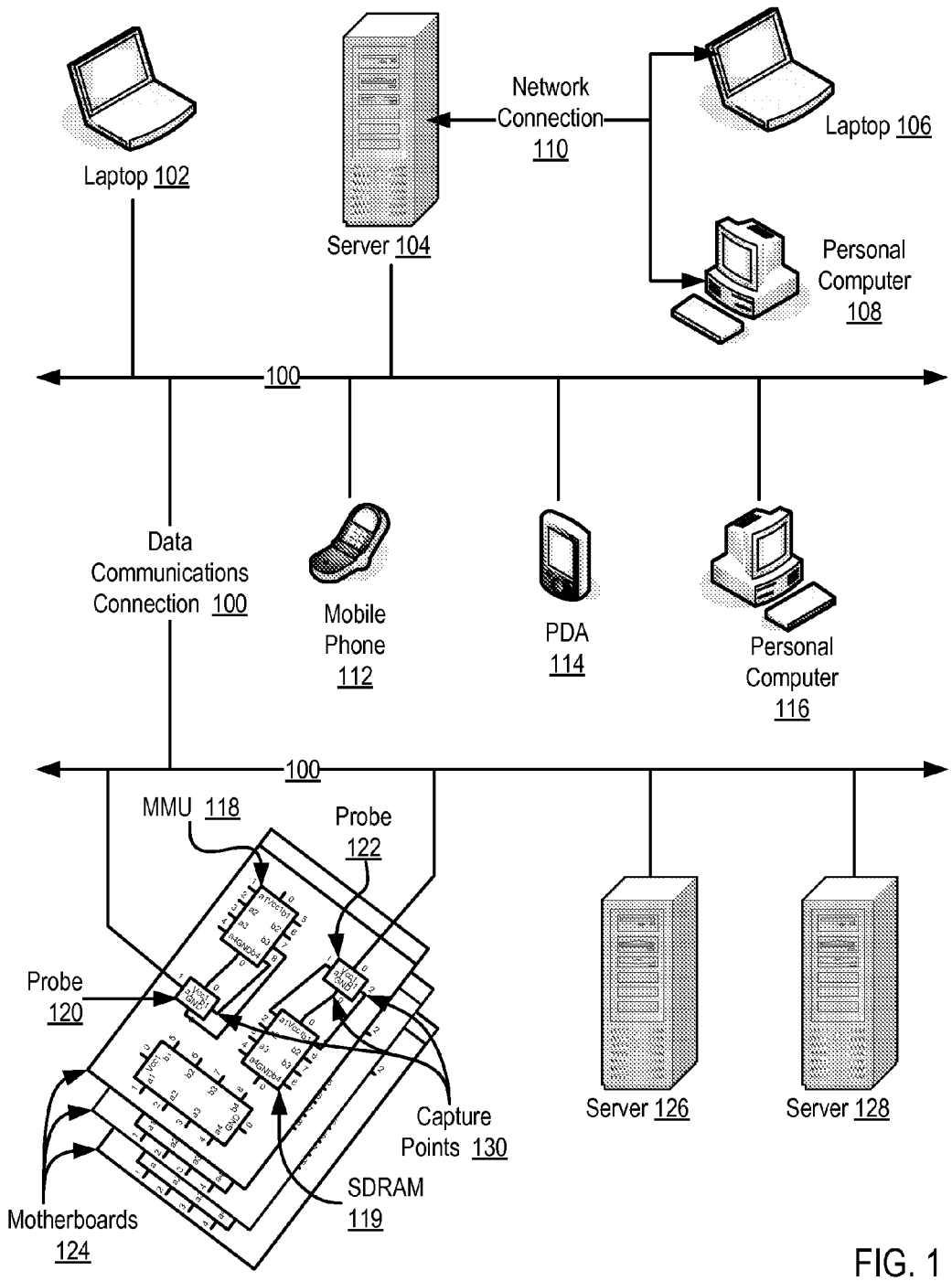
FIG. 1 sets forth a network diagram illustrating an exemplary system for acquiring test data from an electronic circuit according to embodiments of the present invention.

Exemplary methods, systems, and products for acquiring test data from an electronic circuit according to embodiments of the present invention are described with reference to the accompanying drawings, beginning with FIG. 1. FIG. 1 sets forth a network diagram illustrating an exemplary system for acquiring test data from an electronic circuit according to embodiments of the present invention. The system of FIG. 1 operates generally to acquire test data from an electronic circuit according to embodiments of the present invention by mounting a probe adjacent to a capture point on an electronic circuit board, the electronic circuit board having an electronic circuit, capturing by the probe an electronic signal of the electronic circuit, digitizing by the probe the captured signal, and transmitting by the probe the digitized signal from the probe through a data communications connection to a remote device.

The system of FIG. 1 includes probes (120 and 122) mounted on a motherboard (124). Probes (120 and 122) are computer hardware and computer software used to analyze the defects in the operation of electronic circuits and to optimize the performance of electronic circuits. Probes (120 and 122) assist in the analysis and optimization of the operation of electronic circuits by acquiring test data from an electronic circuit according to embodiments of the present invention.

Test data is information that describes an electronic signal of an electronic circuit. Test data may include, for example, representations of an electronic signal's voltage level, current level, frequency, the states of other related electronic signals at the time the test data was acquired, and so on. An electronic signal is any electrical quantity, such as, for example, a voltage, a current, or an electromagnetic frequency, that can be used to transmit information in an electronic circuit. An electronic circuit is a path of travel for electrons through electronic components of an electronic circuit board and electrical conductors of an electronic circuit board.

An electronic circuit board is a flat panel that interconnects electronic components using a pattern of flat conductors, also called 'traces,' laminated onto a non-conductive substrate. An electronic circuit board may contain trace patterns on top and bottom surfaces of the electronic circuit board or in layers through the middle of the electronic circuit board. Trace patterns on different layers of an electronic circuit board interconnect through 'vias.' Vias are conductors that plate the walls of holes extending through the layers of the electronic circuit board. Electronic components connect or mount to the surface of an electronic circuit board at designated portions of the trace pattern called 'pads,' or synonymously referred to as 'lands.' An electronics technician may connect electronic components to the electronic circuit board using, for example, surface mounting technology or through-hole mounting technology. Surface mount technology connects electronic components to an electronic circuit board by soldering electronic component leads or terminals to the top surface of the electronic circuit board. Through-hole mount technology connects electronic components to an electronic circuit board by inserting component leads through holes in the electronic circuit board and then soldering the leads in place on the opposite side of the electronic circuit board.

The system of FIG. 1 includes motherboards (124). Each motherboard (124) in this example is an electronic circuit board that contains the primary components of a computer system. All of the basic electronic circuitry and components required for a computer to function mount either directly on the motherboard (124) or in an expansion slot of the motherboard (124). Each motherboard (124) typically contains one or more computer processors, main memory, support circuitry, a bus controller, and one or more bus connectors. Other electronic circuit boards, including expansion memory and input/output electronic circuits, may attach to a motherboard through the bus connectors. Examples of motherboards (124) that may be improved according to embodiments of the present invention include the Intel D915GUXL Socket 775 Motherboard, the ABIT AA8XE Socket 775 Motherboard, the ASUS P5RD1-V Socket 775 Motherboard, Intel SE7520AF2Dual Xeon Socket 604 and 603 ATX Motherboards, and other as will occur to those of skill in the art.

In the example of FIG. 1, each motherboard (124) includes one or more capture points (130) for mounting a probe (120 or 122) adjacent to a capture point (130) on an electronic circuit board, the electronic circuit board having an electronic circuit. The capture points (130) are pads on the surface of an electronic circuit board for connecting a probe to the electronic circuit board such as, for example, the motherboards (124) depicted in the example of FIG. 1. An electronics technician arranges the capture points (130) around an empty space on the surface of an electronic circuit, the empty space used for mounting a probe adjacent to a capture point on an electronic circuit board, the electronic circuit board having an electronic circuit, such as the motherboard (124) in the example of FIG. 1.

The system of FIG. 1 also includes synchronous dynamic random access memory ('SDRAM') (119) that mounts on a motherboard (124). SDRAM (119) is random access memory that stores binary numbers representing information such as, for example, computer program instructions or other electronic data. SDRAM stores each bit of a binary number in a separate capacitor. The number of electrons stored in the capacitor determines whether the bit is considered 1 or 0. As the capacitor leaks electrons, the stored information is eventually lost unless the charge on the capacitor is periodically refreshed by a computer processor or memory management unit. Because SDRAM (119) requires periodic refreshing, SDRAM (119) is considered 'dynamic' memory as opposed to 'static' memory, which does not need to be refreshed. In addition, SDRAM (119) is termed 'synchronous' because SDRAM (119) has a synchronous interface, meaning that SDRAM (119) waits for a clock pulse before responding to control inputs of the SDRAM (119).

The system of FIG. 1 also includes a memory management unit ('MMU') (118) that mounts on a motherboard (124). The MMU (118) is computer hardware that provides an interface between a computer processor and the SDRAM (119). The MMU (118) provides such an interface by mapping virtual memory addresses manipulated by a computer processor to physical memory addresses in SDRAM (119). A virtual memory address is an address in a virtual memory system that a computer processor and the computer software running on a computer processor use to reference computer memory. A physical memory address is an address that corresponds to a hardware location in SDRAM (119).

In the example of FIG. 1, probe (120) connects through the trace pattern of a motherboard (124) to a memory management unit ('MMU') (118) for acquiring test data from an electronic circuit according to embodiments of the present invention. Probe (122) connects through the trace pattern of a motherboard (124) to synchronous dynamic random access memory ('SDRAM') (119) for acquiring test data from an electronic circuit according to embodiments of the present invention. Probes (120 and 122) are generally capable of acquiring test data from an electronic circuit by capturing by the probe an electronic signal of an electronic circuit, digitizing by the probe the captured signal, and transmitting by the probe the digitized signal from the probe through a data communications connection (100) to a remote device. Probes (120 and 122) are also generally capable of acquiring test data from an electronic circuit by synchronizing acquisition of test data by the probe with acquisition of test data by one or more other probes. Moreover, probes (120 and 122) are generally capable of acquiring test data from an electronic circuit by storing by the probe the digitized signal in the probe. Probes (120 and 122) are also generally capable of acquiring test data from an electronic circuit by processing by the probe the digitized signal.

The system of FIG. 1 also includes servers (126 and 128), a data communications enabled mobile phone (112), a PDA (114), and a personal computer (116). Each device (126, 128, 112, 114, and 116) includes one or more probes and one or more electronic circuit boards for mounting a probe adjacent to a capture point on an electronic circuit board, the electronic circuit boards having electronic circuits. The probes in each device (126, 128, 112, 114, and 116) are generally capable of acquiring test data from an electronic circuit by capturing by the probe an electronic signal of an electronic circuit, digitizing by the probe the captured signal, and transmitting by the probe the digitized signal from the probe through a data communications connection (100) to a remote device. The probes in each device (126, 128, 112, 114, and 116) are also generally capable of acquiring test data from an electronic circuit by synchronizing acquisition of test data by the probe with acquisition of test data by one or more other probes. Moreover, the probes in each device (126, 128, 112, 114, and 116) are generally capable of acquiring test data from an electronic circuit by storing by the probe the digitized signal in the probe. The probes in each device (126, 128, 112, 114, and 116) are also generally capable of acquiring test data from an electronic circuit by processing by the probe the digitized signal.

In the example of FIG. 1, probes (120 and 122) and the probes in devices (112, 114, 116, 126, and 128) interconnect through data communications connection (100). The data communications connection (100) in the example of FIG. 1 is a medium for transferring data between various devices and computers connected together within an overall data processing system. The data communication connection (100) may include, for example, serial connections such as RS-232, external bus connections such as the Universal Serial Bus ('USB') and IEEE 1394 ('FireWire'), network connections such as LANs, WANs, intranets, internets, the Internet, webs, the World Wide Web itself, and any other data communications connection as will occur to those of skill in the art. Data communications connection (100) may support a variety of data communications protocols, including, for example, the USB protocol, the IEEE 1394 protocol, the Transmission Control Protocol ('TCP'), the Internet Protocol ('IP'), the HyperText Transfer Protocol ('HTTP'), the Wireless Access Protocol ('WAP'), the Handheld Device Transport Protocol ('HDTP'), the Bluetooth protocol, and others as will occur to those of skill in the art.

In the system of FIG. 1, probe (120) synchronizes the acquisition of test data by the probe (120) with acquisition of test data by probe (122) through data communications connection (100). Because synchronization occurs through data communications connection (100) and not through the trace pattern of an electronic circuit board, probes (120 and 122) may synchronize the acquisition of test data even when mounted adjacent to capture points on different electronic circuit boards, the electronic circuit boards having electronic circuits. In the example of FIG. 1, the depiction of probes (120 and 122) on the same motherboard (124) therefore is for explanation and not limitation. In fact, probe (120) may synchronize the acquisition of test data by the probe (120) with acquisition of test data by one or more other probes in devices (112, 114, 116, 126, and 128) through data communications connection (100) without regard to the physical location of the probes.

Data communications connection (100) is shown in FIG. 1 as a single data communications line—only for purposes of explanation, not as a limitation of the present invention. Readers of skill in the art will recognize that it may be desirable in some embodiments to implement a data communications connection with two lines or channels, one for data flow and another for synchronization signals. Such a separate synchronization channel may usefully operate at a higher speed for greater temporal resolution than a data channel in some embodiments. In addition, systems for acquiring test data from an electronic circuit according to embodiments of the present invention may implement other architectures for data communications and synchronization between probes as may occur to those of skill in the art.

The system of FIG. 1 also includes laptop (102) connected to probes (120 and 122) and the probes in devices (112, 114, 116, 126, and 128) through data communications connection (100). Laptop (102) is a remote device generally capable of acquiring test data from an electronic circuit by synchronizing acquisition of test data by a probe with acquisition of test data by one or more other probes, receiving in the remote device through a data communications connection (100) digitized signals captured and transmitted from two or more such synchronized probes, synchronizing by the remote device the received signals for display, and displaying by the remote device the synchronized signals.

The system of FIG. 1 also includes server (104), laptop (106), and personal computer (108) interconnected through network connection (110). Server (104) connects to probes (120 and 122) and the probes in devices (112, 114, 116, 126, and 128) through data communications connection (100). Server (104) is a remote device generally capable of acquiring test data from an electronic circuit by synchronizing acquisition of test data by a probe with acquisition of test data by one or more other probes and receiving in the remote device through a data communications connection (100) digitized signals captured and transmitted from two or more such synchronized probes. In the example of FIG. 1, server (104) stores the received signals for data processing by laptop (106), personal computer (108), or server (104) itself. Laptop (106) and personal computer (108) access the stored signals on server (104) through network connection (110).

The network connection (110) in the example of FIG. 1 may be implemented as LANs, WANs, intranets, internets, the Internet, webs, the World Wide Web itself, or other connections as will occur to those of skill in the art. Network connection (110) may support many data communications protocols, including, for example, the Transmission Control Protocol ('TCP'), the Internet Protocol ('IP'), the HyperText Transfer Protocol ('HTTP'), the Wireless Access Protocol ('WAP'), the Handheld Device Transport Protocol ('HDTP'), and others as will occur to those of skill in the art.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Various embodiments of the present invention may be implemented on a variety of hardware platforms in addition to those illustrated in FIG. 1.

Acquiring test data from an electronic circuit in accordance with the present invention is generally implemented with probes that are made of automated computing machinery. In the system of FIG. 1, for example, all the probes are implemented to some extent at least as computers. For further explanation, therefore, FIG. 2 sets forth a block diagram of automated computing machinery that includes an exemplary probe (120) useful in acquiring test data from an electronic circuit according to embodiments of the present invention. The system of FIG. 2 operates generally to acquire test data from an electronic circuit according to embodiments of the present invention by mounting a probe adjacent to a capture point on an electronic circuit board, the electronic circuit board having an electronic circuit, synchronizing acquisition of test data by the probe with acquisition of test data by one or more other probes, capturing by the probe an electronic signal of the electronic circuit, digitizing by the probe the captured signal, storing by the probe the digitized signal in the probe, processing by the probe the digitized signal, transmitting by the probe the digitized signal from the probe through a data communications connection to a remote device, receiving in the remote device through a data communications connection digitized signals captured and transmitted from two or more such synchronized probes, synchronizing by the remote device the received signals for display, and displaying by the remote device the synchronized signals.

Figure 2:
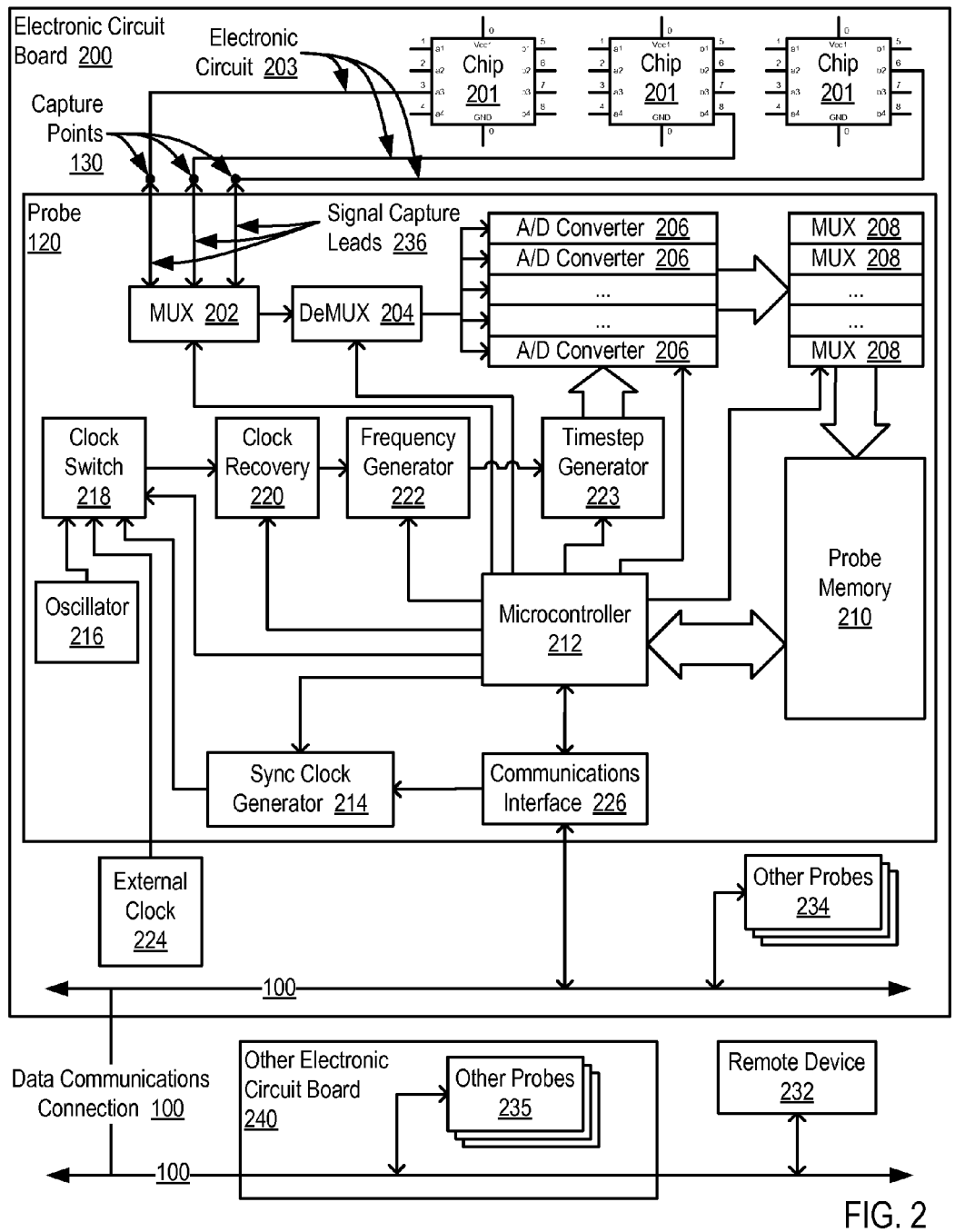
FIG. 2 sets forth a block diagram of automated computing machinery that includes an example of a probe useful in acquiring test data from an electronic circuit according to embodiments of the present invention.

The system of FIG. 2 includes an electronic circuit board (200) that, as mentioned above, interconnects electronic components using a pattern of flat conductors, also called 'traces,' laminated onto a non-conductive substrate. The electronic circuit board (200) includes capture points (130) and empty surface space for mounting a probe (120) adjacent to a capture point (130) on the electronic circuit board (200), the electronic circuit board (200) having electronic circuits (203). The capture points (130) connect to chips (201) through the trace patterns on the electronic circuit board to form electronic circuits (203).

The system of FIG. 2 includes chips (201) mounted on the electronic circuit board (200). Chips (201) are integrated circuits that include interconnected elements, such as for example, transistors, resistors, capacitors, or inductors, inseparably associated and formed on or within a single substrate such as silicon, gallium arsenide, sapphire, and so on. Examples of chips (201) depicted in the example of FIG. 2 may include, for example, computer processors, memory management units, computer memory, dual in-line packages, and so on.

The system of FIG. 2 also includes a probe (120). Probe (120) mounts adjacent to capture points (130) on the electronic circuit board (200), the electronic circuit board (200) having electronic circuits (203). The probe (120) itself includes an electronic circuit board that interconnects electronic components for acquiring test data from an electronic circuit (203) according to embodiments of the present invention.

The probe (120) in the example of FIG. 2 includes a microcontroller (212). The microcontroller (212) is a single integrated circuit that contains a processing core, memory such as read-only memory ('ROM') for storing microcontroller program instructions, memory such as random access memory ('RAM') for storing data, one or more timers, as well as input/output lines to communicate with external peripherals and complementary resources. In the example of FIG. 2, the memory of microcontroller (212) contains microcontroller program instructions generally capable of controlling the electronic components on probe (120) to acquire test data from an electronic circuit (203) according to embodiment of the present invention. Examples of microcontrollers (212) that may be improved according to embodiments of the present invention include the Triscend E5 User-Configurable Microcontroller, the Freescale e500 85xx PowerQUICC III Family of microcontrollers, the Atmel TSC87251G2D microcontroller, and others that will occur to those of skill in the art.

The probe (120) in the system of FIG. 2 includes signal capture leads (236) for capturing by the probe (120) an electronic signal of the electronic circuit (203). Signal capture leads (236) are small conductors that extend from the probe (120) and connect to the capture points (130) on the electronic circuit board (200). Signal capture leads (236) may be connected to the capture points (130) using, for example, surface mounting technology or through-hole mounting technology.

The probe (120) includes a digital multiplexer (202) that includes one or more input leads, an output lead, and a selection lead. The multiplexer (202) is an electronic component that directs a captured signal received at one of the input leads and to the output lead based on a selection signal received at the selection lead. In the example of FIG. 2, the input lines of the multiplexer (202) connect to the signal capture leads (236). The output lead of the multiplexer (202) connects to a demultiplexer (204). The selection lead of the multiplexer (202) connects to the microcontroller (212). In the example of FIG. 2, the multiplexer (202) directs a captured signal received through one of the signal capture leads (236) selected by the microcontroller (212) to the demultiplexer (204).

The probe (120) includes a digital demultiplexer (204) that includes an input lead, one or more output leads, and a selection lead. The demultiplexer (204) is an electronic component that directs a captured signal received at the input lead to one of the output leads based on a selection signal received at the selection lead. In the example of FIG. 2, the input lead of demultiplexer (204) connects to multiplexer (202). Each output lead of demultiplexer (204) connects to one of the analog to digital converters (206). The selection lead of the demultiplexer (204) connects to the microcontroller (212). In the example of FIG. 2, the demultiplexer (204) directs the captured signal received from the multiplexer (202) to one of the analog to digital converters (206) selected by the microcontroller (212).

The probe (120) includes one or more analog to digital converters (206) for digitizing by the probe (120) the captured signal, each analog to digital converter (206) including an input lead, one or more output leads, a clock pulse lead, and an enabling lead. Each analog to digital converter (206) is electronic component that generates a discrete binary number that represents the value of the captured signal when the analog to digital converter receives a clock pulse in the clock pulse lead and when the analog to digital converter receives an enabled signal in the enabling lead. Each binary number produced by an analog to digital converter is referred to as a 'sample' of the captured signal. The process of an analog to digital converter's converting a captured signal into a binary number is referred to as 'sampling.' The rate at which a single analog to digital converter generates samples is referred to as a 'sampling frequency.' The sampling frequency may be significantly greater than the synch clock frequency thereby enabling high fidelity capture of very fast edge rates. In the example of FIG. 2, each analog to digital converter (206) receives the captured signals at the analog to digital converter's input lead connected to a corresponding output lead of multiplexer (204). Each analog to digital converter (206) transmits the bits of the binary number representing the value of the captured signal along output leads. Each output lead carries one bit of the binary number representing the value of the captured signal and connects to the corresponding input lead of each multiplexer (208). The clock pulse lead of each analog to digital converter (206) connects to a timestep generator (223), while the enabling lead of each analog to digital converter (206) connects to the microcontroller (212). Examples of analog to digital converters (206) that may be useful in acquiring test data from an electronic circuit according to embodiments of the present invention include, for example, direct conversion analog to digital converters, two step analog to digital converters, ramp-compare analog to digital converters, successive approximation analog to digital converters, delta-encoded analog to digital converters, and so on.

Because the process of digitizing the capture signal is not instantaneous, each analog to digital converter (206) requires a finite period of time for digitizing the captured signal. This period of time is called the 'conversion time.' During the conversion time, each analog to digital converter (206) must necessarily hold the captured signal constant while the analog to digital converter (206) digitizes the captured signal. Each analog to digital converter (206) may hold the captured signal constant by using a capacitor to store the analog voltage at the input lead and by using an electronic switch or gate to disconnect the capacitor from the input lead once the charge is stored.

The example of FIG. 2 depicts more than one analog to digital converter (206) for digitizing by the probe (120) the captured signal because more than one analog to digital converters is necessary when the conversion time of a single analog to digital converter (206) is greater than the time between each sample generated at a 'probe sampling frequency.' The probe sampling frequency is the rate at which all the analog to digital converters (206) on probe (120), taken together, generate samples of the captured signal. The number of analog to digital converters (206) necessary to generate samples at a desired probe sampling frequency is the desired probe sampling frequency times the conversion time for a single analog to digital converter. Consider, for example, a probe (120) where the desired probe sampling frequency is 10 megahertz and the conversion time for a single analog to digital converter is 0.5 microseconds. The number of analog to digital converters is calculated as:

$$N = F*C = 10 \text{ megahertz} * 0.5 \text{ microseconds} = 5 \text{ analog to digital converters}$$

where N is the number of analog to digital converters necessary to generate samples at a desired probe sampling frequency, F is the desired probe sampling frequency, and C is the conversion time for a single analog to digital converter.

To generate clock pulses at a sampling frequency for each analog to digital converter (206), the system of FIG. 2 includes oscillator (216), external clock (224), and synchronization clock generator (214). The oscillator (216) in the example of FIG. 2 mounts on probe (120) and connects to a clock switch (218). The oscillator (216) is a crystal oscillator that uses the mechanical resonance of a physical crystal of piezoelectric material along with an amplifier and feedback to create an electrical signal a particular frequency. The oscillator (216) provides a clock pulse to probe (120) for synchronizing acquisition of test data by probe (120) with the timing of the electronic circuits of the probe (120). That is, oscillator (216) allows the probe (120) to acquire test data independent of any timing of the electronic circuits on the electronic circuit board (200).

The electronic circuit board (200) in the example of FIG. 2 includes an external clock (224). The external clock is a crystal oscillator that uses the mechanical resonance of a physical crystal of piezoelectric material along with an amplifier and feedback to create an electrical signal a particular frequency. The external clock (224) provides a clock signal to the electronic circuit (200) for timing the operations of electronic components connected to the electronic circuit board (200). The external clock (224) also provides a clock pulse to probe (120) for synchronizing acquisition of test data by probe (120) with the timing of the electronic circuits of the probe (216).

In the example of FIG. 2, the probe (120) also includes synchronization clock generator (214) for synchronizing acquisition of test data by the probe (120) with acquisition of test data by one or more other probes (234 and 235). The synchronization clock generator (214) is computer hardware that extracts a synchronization clock signal provided through data communications connection (100). As discussed in more detail below, a data communications connection, such as, for example, a USB connection, may be improved according to embodiments of the present invention by adding a alternating current ('AC') synchronization clock signal to the direct current ('DC') $V_{BUS}$ signal that delivers power to USB devices. Because $V_{BUS}$ delivers power to USB devices as a DC voltage, the synchronization clock generator (214) may be implemented a high-pass filter to extract the synchronization clock signal from the $V_{BUS}$ signal.

In the example of FIG. 2, the probe (120) includes a clock switch (218) connected to oscillator (216), external clock (224), synchronization clock generator (214), clock recovery (220), and microcontroller (212). The clock switch (218) is a multiplexer controlled by microcontroller (212). The inputs leads of the clock switch (218) receive clock pulses from oscillator (216), external clock (224), and synchronization clock generator (214). The clock switch (218) directs one of the clock pulses selected by the microcontroller (212) to an output lead connected to a clock recovery (220).

The probe (120) in the example of FIG. 2 also includes a clock recovery circuit (220) connected to the clock switch (218), frequency generator (222), and the microcontroller (212). The clock recovery circuit (220) is computer hardware that sharpens the transition edges of the clock pulses received through the clock switch (218). The clock recovery circuit (220) operates when the clock recovery (220) receives an enabled signal in the enabling lead connected to the microcontroller (212). The clock recovery circuit (220) in the example of FIG. 2 may be implemented, for example, as a threshold detector.

The probe (120) in the example of FIG. 2 also includes a frequency generator (222) connected to the clock recovery circuit (220), timestep generator (223), the microcontroller (212). The frequency generator (222) is computer hardware that generates a clock pulse at an output frequency based on the clock pulse provided by clock recovery (220). The frequency generator (222) operates when the frequency generator (222) receives an enabled signal in the enabling lead connected to the microcontroller (212). The frequency generator in the example of FIG. 2 may be implemented, for example, as a phase lock loop with the frequency of the clock pulses provided through the clock recovery (220) as a reference frequency.

A phase lock loop includes a voltage-controlled oscillator that may be tuned to match a reference frequency using a semiconductor diode called a varactor, a phase comparator, and a frequency divider. The phase comparator causes the voltage-controlled oscillator to seek and lock onto the reference frequency by means of a feedback scheme. If the voltage-controlled oscillator frequency departs from the reference frequency of the clock pulse, the phase comparator produces an error voltage that is applied to the varactor and brings the output frequency of the voltage-controlled oscillator back to the reference frequency. To increase the output frequency to a multiple of the reference frequency, the frequency divider is placed in the phase-locked loop's feedback path to divided-down the output frequency of the voltage-controlled oscillator fed-back into the phase comparator. Because the divided down output frequency is smaller than the reference frequency, the phase comparator generates a voltage signal to the voltage-controlled oscillator that increases the output frequency. The phase lock loop continues to increase the output frequency via the feedback loop until the divided-down output frequency from the voltage-controlled oscillator output equals the reference frequency. When the divided-down output frequency equals the reference frequency, the phase comparator stabilizes and generates no more signals to the voltage-controlled oscillator. The value of the output frequency from the voltage-controlled oscillator is the value of the reference frequency multiplied by the value of the frequency divider. Consider, for example, a frequency generator (222) where the value of the frequency of a clock pulse provided through the clock recovery (220) is 10 megahertz and the frequency divider has a value of 10. The value of the output frequency is calculated as:

$$O = R*D = 10 \text{ megahertz} * 10 = 100 \text{ megahertz}$$

where O is the value of the output frequency, R is the value of the reference frequency, and D is the value of the frequency divider. In this example, the frequency generator (222) generates a 100 megahertz pulse for the timestep generator (223) from the 10 megahertz pulse provided through the clock recovery (220).

Because probe (120) in the example of FIG. 2 includes more than one analog to digital converter (206), the probe (120) includes a timestep generator (223) connected to the frequency generator (222), each analog to digital converter (206), and microcontroller (212). The timestep generator (223) is computer hardware that generates a clock pulse at sampling frequency for each analog to digital converter (206) from the single output frequency provided by the frequency generator (222), each sampling frequency out of phase from the other sampling frequencies by a multiple of a 'phase difference.' The phase difference between each sampling frequency is 360 degrees divided by the number of analog to digital converters (206). Consider, for example, a probe (120) where the number of analog to digital converters (206) is 10. The phase difference between each sampling frequency is calculated as:

$$P = 360 \text{ degrees} \div N = 360 \text{ degrees} \div 10 = 36 \text{ degrees}$$

where P is the value of the phase difference between each sampling frequency of an analog to digital converter (206) and N is the number of analog to digital converters (206) on probe (120). In this example, each analog to digital converter (206) generates samples at a sampling frequency out of phase from the other analog to digital converters by a multiple of 36 degrees. The timestep generator (223) in the example of FIG. 2 may be implemented, for example, as a chain of delay lines such as, for example, the Dallas Semiconductor DS1020 or DS1021 8-Bit programmable delay lines.

When the microcontroller (212) enables the analog to digital converters (206) through an enabling lead of the analog to digital converter, the analog to digital converters outputs a binary number representing a value of a captured signal to multiplexers (208). The probe (120) in the example of FIG. 2 therefore includes one or more multiplexers (208) for directing digitized signal from one or more analog to digital converters (206) to probe memory (210) where each multiplexer (208) connects to each analog to digital converter (206), probe memory (210), and microcontroller (212). The number of multiplexers (208) included in probe (120) is the number of bits of the binary number representing the digitized signal. The inputs of each multiplexer (208) connect to the outputs of each analog to digital converter (206) so that each multiplexer (208) receives the same bit number of the binary number provided by each analog to digital converter (206). For example, one multiplexer (208) may receive the least significant bit of the binary numbers generated by each analog to digital converter (206). Another multiplexer (208) may receive the second least significant bit of the binary numbers generated by each analog to digital converter (206). And so on. The output of each multiplexer (208) connects to a data lead of probe memory (210) for the bit number corresponding to the bit number received by the multiplexer (208). For example, the output of the multiplexer (208) receiving the least significant bit from all of the analog to digital converters (206) connects to the data lead of probe memory for receiving the least significant bit of a binary number for storage.

In the example of FIG. 2, probe (120) also includes probe memory (210) for storing by the probe the digitized signal in the probe. Probe memory (210) in the example of FIG. 2 may be implemented as random access memory ('RAM') such as, for example, static RAM, dynamic RAM, synchronous dynamic RAM, and so on. Data leads of the probe memory (210) connect to each multiplexer (208) for receiving digitized signals generated by the analog to digital converters (206). Data leads of the probe memory (212) also connect to the microcontroller (212) for providing and receiving data to and from the microcontroller (212). Addressing leads of the probe memory (210) connect to the microcontroller (212) for receiving a memory location in probe memory (210) for storing or accessing data. Probe memory (210) also includes a clock pulse lead connected to the microcontroller (212) for receiving clock pulses. At the data leads, the probe memory (210) receives a value representing the digitized signal generated by one of the analog to digital converters (206) and any data from the microcontroller (212) associated with the digitized signal. Such data associated with the digitized signal may include, for example, a probe identifier, a signal capture lead identifier, a value a clock pulse counter when an analog to digital converter generated the digitized signal, and so on. When probe memory (210) receives a clock pulse, the probe memory (210) stores the data received at the data leads at the memory location received at the addressing leads. If no data is received at the data leads when the memory (210) receives a clock pulse, the probe memory (210) populates the data leads with the data stored at the memory location received at the addressing leads. Once the probe memory (210) populates the data leads with the stored data, the microcontroller (212) may then access the stored data for processing by the probe (120) the digitized signals stored in probe memory (210) and transmitting by the probe (120) the digitized signals from the probe (120) through a data communications connection (100) to a remote device (232).

The exemplary probe (120) of FIG. 2 includes a communications interface (226) for implementing data communications connection (100) with other probes (234 and 235) and remote device (232). Communications interface (226) implements the hardware level of data communications through which one probe sends data communications to other probes (234 and 235) or remote device (232), directly, through a bus, or through a network, for acquiring test data from an electronic circuit according to embodiments of the present invention. Examples of communications adapters that may be improved for acquiring test data from an electronic circuit according to embodiments of the present invention include modems for wired dial-up communications, USB bus interfaces, FireWire controllers, Ethernet (IEEE 802.3) adapters for wired network communications, and 802.11b adapters for wireless network communications.

The system of FIG. 2 includes other probes (234) mounted adjacent to capture points on the electronic circuit board (200) and includes still other probes (235) mounted adjacent to capture points on another electronic circuit board (240), the other electronic circuit board (240) having electronic circuits. Other probes (234 and 235) are similar in structure to probe (120). In the example of FIG. 2, probe (120) and other probes (234 and 235) interconnect through data communications connection (100) for synchronizing acquisition of test data by the probe (120) with acquisition of test data by one or more other probes (234 and 235).

The system of FIG. 2 also includes remote device (232). The remote device (232) is a computer generally capable of acquiring test data from an electronic circuit (203) by synchronizing acquisition of test data by the probe (120) with acquisition of test data by one or more other probes (234 and 235) by providing from the remote device (232) through the data communications connection (100) to such synchronized probes (120, 234, and 235) a synchronization clock signal, receiving in the remote device (232) through the data communications connection (100) digitized signals captured and transmitted from two or more such synchronized probes (120, 234, and 235), synchronizing by the remote device (232) the received signals for display, and displaying by the remote device (232) the synchronized signals.

Figure 3:
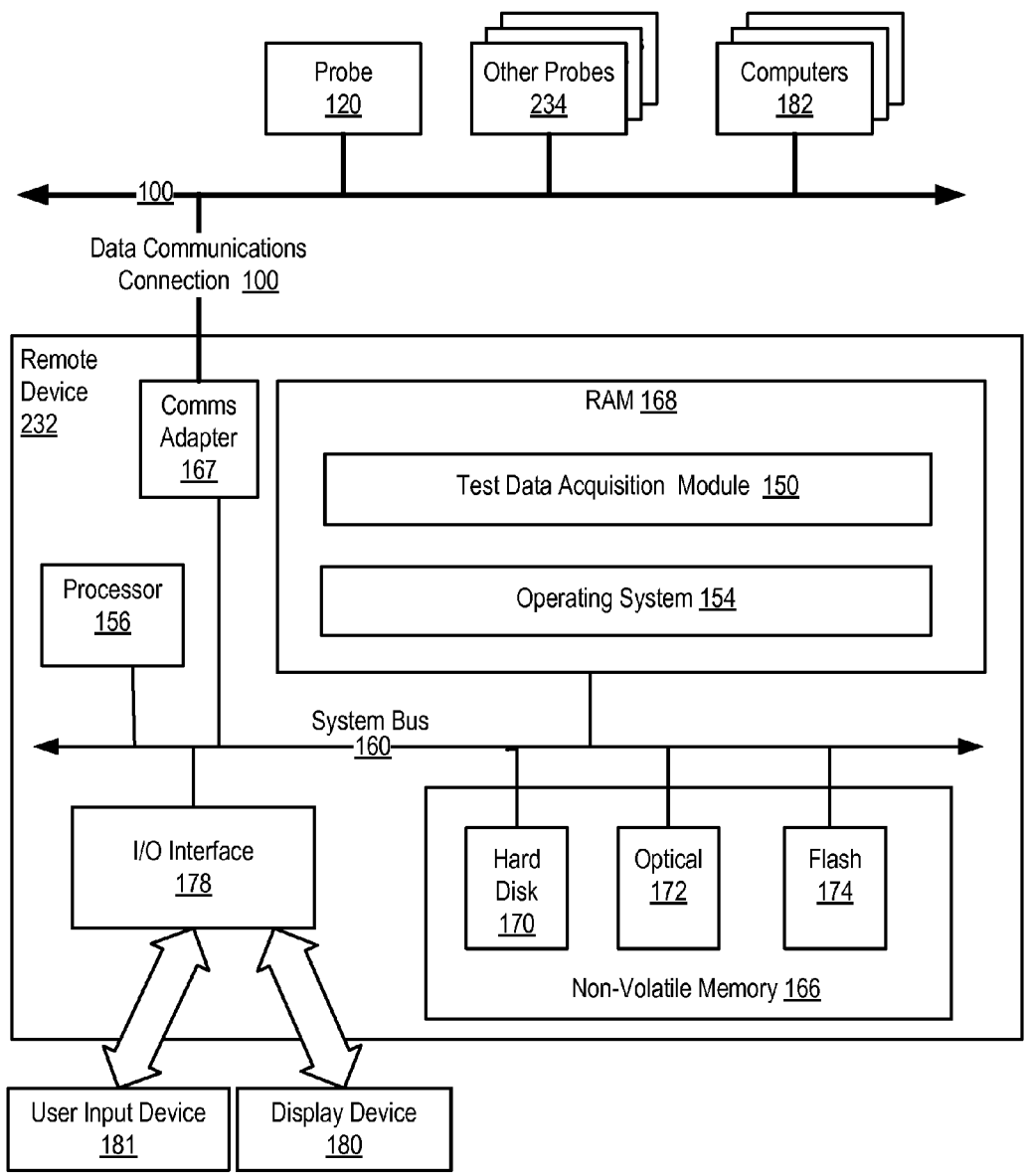
FIG. 3 sets forth a block diagram of automated computing machinery that includes an example of a remote device useful in acquiring test data from an electronic circuit according to embodiments of the present invention.

As mentioned above, acquiring test data from an electronic circuit in accordance with the present invention is generally implemented with computers, that is, with automated computing machinery. All of the remote devices in the systems of FIG. 1 and FIG. 2, for example, are implemented to some extent at least as computers. For further explanation, therefore, FIG. 3 sets forth a block diagram of automated computing machinery that includes an example of a remote device (232) useful in acquiring test data from an electronic circuit according to embodiments of the present invention. The remote device (232) of FIG. 3 is a computer that includes at least one computer processor (156) or 'CPU' as well as random access memory (168) ('RAM') which is connected through a system bus (160) to processor (156) and to other components of the computer. A remote device is characterized as 'remote' because the remote device is not mounted adjacent to a capture point on an electronic circuit board.

Stored in RAM (168) is a test data acquisition module (150), computer program instructions improved for acquiring test data from an electronic circuit according to embodiments of the present invention by synchronizing acquisition of test data by the probe (120) with acquisition of test data by one or more other probes (234 and 235), receiving in the remote device (232) through a data communications connection (100) digitized signals captured and transmitted from two or more such synchronized probes (120, 234, and 235), synchronizing by the remote device (232) the received signals for display, and displaying by the remote device (232) the synchronized signals.

Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154) and test data acquisition module (150) in the example of FIG. 3 are shown in RAM (168), but many components of such software typically are stored in non-volatile memory (166) also.

Remote device (232) of FIG. 3 includes non-volatile computer memory (166) coupled through a system bus (160) to processor (156) and to other components of the remote device (232). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary remote device (232) of FIG. 3 includes a communications adapter (167) for implementing data communications connection (100) with computers (182), probe (120), and other probes (234). Communications adapter (167) implements the hardware level of data communications through which one computer sends data communications to another computer, directly, through a bus, or through a network, for acquiring test data from an electronic circuit according to embodiments of the present invention. Examples of communications adapters that may be improved for acquiring test data from an electronic circuit according to embodiments of the present invention include modems for wired dial-up communications, USB controllers, FireWire controllers, Ethernet (IEEE 802.3) adapters for wired network communications, and 802.11b adapters for wireless network communications.

Figure 4:
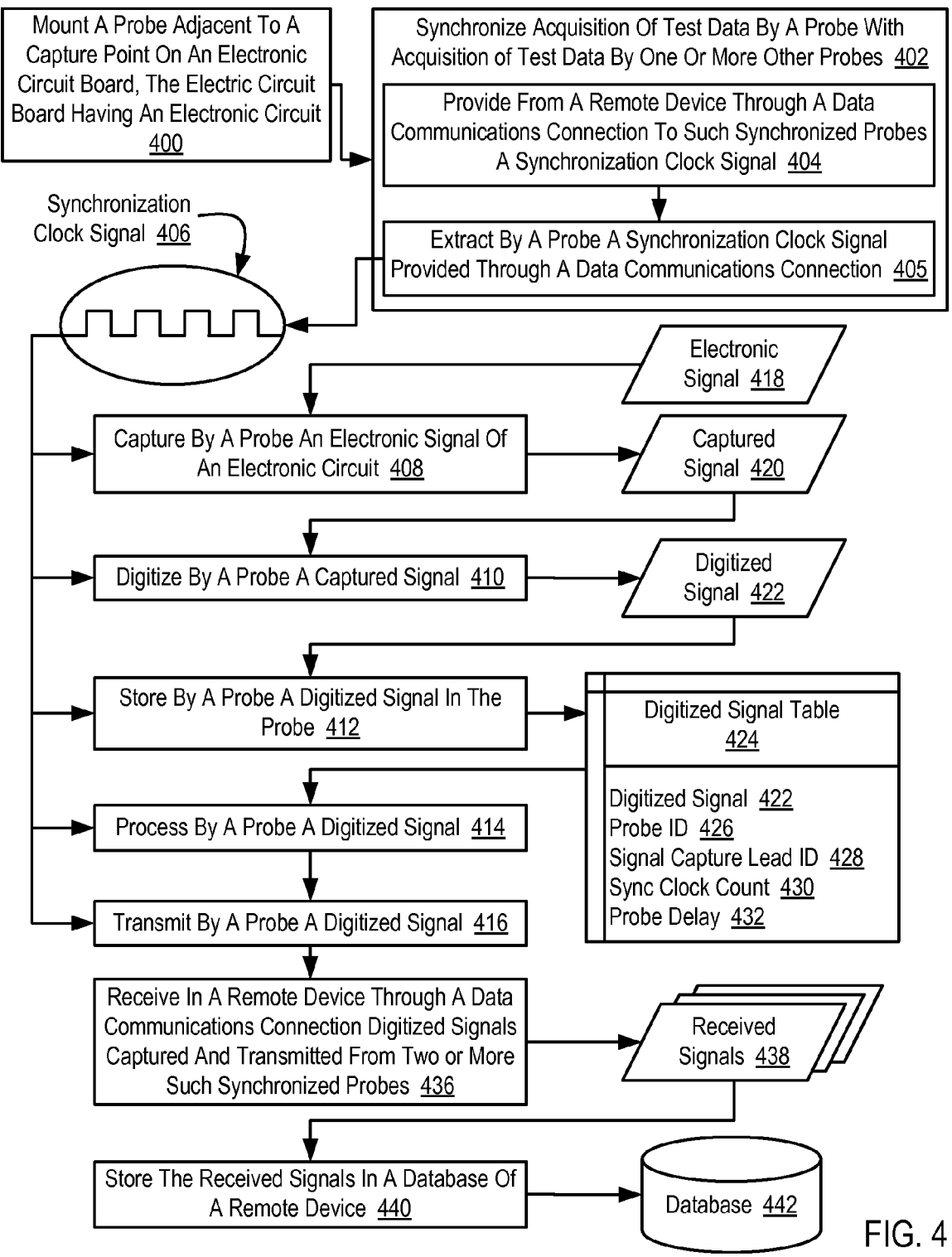
FIG. 4 sets forth a flow chart illustrating an exemplary method for acquiring test data from an electronic circuit according to embodiments of the present invention.

For further explanation, FIG. 4 sets forth a flow chart illustrating an exemplary method for acquiring test data from an electronic circuit according to embodiments of the present invention. The method of FIG. 4 includes mounting (400) a probe adjacent to a capture point on an electronic circuit board, the electronic circuit board having an electronic circuit. An electronics technician may mount (400) a probe adjacent to a capture point on an electronic circuit board using, for example, surface mounting technology or through-hole mounting technology.

The method of FIG. 4 also includes synchronizing (402) acquisition of test data by the probe with acquisition of test data by one or more other probes. Synchronizing (402) acquisition of test data according to the method of FIG. 4 includes providing (404) from a remote device through a data communications connection to such synchronized probes a synchronization clock signal (406). The synchronization clock signal (406) is a stream of clock pulses that provide a clock pulse to each synchronized probe at the same frequency. A remote device may provide (404) a synchronization clock signal (406) to allow all of the synchronized probes to sample electronic signals with the same time interval between samples. Consider, for example, where the synchronization clock signal (406) is a stream of clock pulse generated by the remote client at a rate of 10 megahertz. Each of the synchronized probes may sample electronic signals every 0.1 microseconds, which equals 1÷10 megahertz. Probes sampling electronic signals at the same frequency based on the synchronization clock signal (406) are 'synchronized,' or operating in 'synchronization.' A remote device may also provide (404) a synchronization clock signal (406) to initialize the synchronization of two or more probes. A remote device may initialize the synchronization of two or more probes by varying amplitude or frequency of the synchronization clock signal (406) to create a pattern of clock pulses identified by the probes as an initialization sequence. After receiving the initialization sequence, the probes may start sampling electronic signals at the next clock pulse of the synchronization clock signal (406).

The remote client may provide (404) the synchronization clock signal (406) by transmitting the synchronization clock signal (406) through a data communications connection improved according to embodiment of the present invention. Consider a data communications connection implemented, for example, as a USB connection described in the USB specification entitled 'Universal Serial Bus Specification Revision 2.0.' authored by Compaq, Hewlett-Packard, Intel, Lucent, Microsoft, NEC, Philips. USB is a cable bus that supports data exchange and power transfer between a host computer and a wide range of simultaneously accessible devices. The attached devices share USB bandwidth through a host-scheduled, token-based protocol. USB allows devices to be attached, configured, used, and detached while the host and other devices are in operation. A USB cable consists of two power conductors and two signal conductors. Data exchange between a host and a USB device occurs through 'D+' and 'D−' differential signals carried over the two signal conductors of a USB cable. The two power conductors deliver DC power to a USB device through a '$V_{BUS}$' signal and a 'GND' reference signal. The remote client may therefore transmit the synchronization clock signal (406) through a USB connection improved according to embodiments of the present invention by adding clock pulse to the $V_{BUS}$ signal of a USB cable.

Synchronizing (402) acquisition of test data according to the method of FIG. 4 also includes extracting (405) by a probe a synchronization clock signal (406) provided through a data communications connection. Continuing with the example from above where the data communications connection is implemented as a USB connection improved according to embodiments of the present invention, a probe may extract (405) the synchronization clock signal (406) added to the $V_{BUS}$ signal through contact number 1 of a USB wire by utilizing a high-pass filter to block DC $V_{BUS}$ signal and allow the AC synchronization clock signal (406) to pass through the filter.

The method of FIG. 4 includes capturing (408) by the probe an electronic signal (418) of the electronic circuit. The electronic signal (418) represents any electrical quantity, such as, for example, a voltage, a current, or an electromagnetic frequency, that can be used to transmit information in an electronic circuit. A probe may capture (408) electronic signal (418) by connecting the leads of a probe to capture points on an electronic circuit board and receiving in the signal capture leads of the probe through the capture points the electronic signal (418) of an electronic circuit.

The method of FIG. 4 includes digitizing (410) by the probe the captured signal (420). The captured signal (420) represents an electronic signal received in the signal captures leads of a probe. A probe may digitize (410) the captured signal (420) by generating a discrete binary number that represents the value of the captured signal (420) at a particular point in time. A probe may generate the binary number representing the value of the captured signal (420) through an analog to digital converter.

The method of FIG. 4 includes storing (412) by the probe the digitized signal (422) in the probe. The digitized signal (422) represents a binary number that represents the value of the captured signal (420) at a particular point in time. In the example of FIG. 4, a probe stores (412) the digitized signal (422) in a digitized signal table (424). The digitized signal table (424) in the example of FIG. 4 associates a digitized signal (422) with a probe identifier (426), signal capture lead identifier (428), a synchronization clock count (430), and a probe delay (432). The digitized signal table (424) may reside in probe memory such as, for example, static RAM, dynamic RAM, synchronous dynamic RAM, and so on. The probe identifier (426) represents the probe that generated the digitized signal (422). The signal capture lead identifier (428) represents the signal capture lead that received the captured signal (420) used by the probe to generate digitized signal (422). The synchronization clock count (430) represents the number of clock pulses of the synchronization clock signal (406) received by the probe during a time period beginning when two or more probes became synchronized and ending when the probe generates the digitized signal (422). The probe delay (432) represents the time period beginning when a remote device transmits a clock pulse of the synchronization clock signal (406) and ending when the probe generating digitized signal (422) receives the transmitted clock pulse. A probe delay (432) may be associated with a digitized signal (422) because of the finite amount of time required for the synchronization clock pulse (406) to travel through a data communications connection from the remote device to the probe. The value of the probe delay (430) associated with a digitized signal (422) may be stored as a system parameter of the probe generating digitized signal (422) or determined at the initialization of a data communications connection between a probe and a remote client device.

The method of FIG. 4 also includes processing (414) by the probe the digitized signal (422). In the example of FIG. 4, a probe may process (414) the digitized signals (422) by sample counting the digitized signals (422) in the digitized signal table (424). Sample counting is a data processing method that determines the number of times that data of a data set satisfies a criterion. For example, a probe may determine the number of times within the last 1000 clock pulses that the digitized signal (422) represented a captured signal (420) with a voltage greater than 1.5 volts. In the example of FIG. 4, a probe may also process (414) the digitized signals (422) by generating data representing a histogram of the values of digitized signal (422) in the digitized signal table (424). For example, a probe may determine the number of times the value of the digitized signal (422) is 0, 1, 2, 3, and so on. In the example of FIG. 4, a probe may also process (414) the digitized signals (422) by applying data compression techniques to the digitized signals (422) in the digitized signal table (424). Examples of data compression techniques that a probe may apply to the digitized signal (422) include Huffman coding, the Lempel-Ziv-Welch technique, the discrete cosine transformation technique, and so on. Although processing (414) by the probe the digitized signal (422) has been described in terms of sample counting, generating histogram data, and data compression techniques, such processing (414) by the probe the digitized signal (422) is for explanation only and not for limitation. In fact, any technique for processing (414) by the probe the digitized signal (422) as will occur to those of skill in the art may be implemented.

The method of FIG. 4 includes transmitting (416) by the probe the digitized signal (422) from the probe through a data communications connection to a remote device. Consider, for example, a data communications connection implemented as a USB connection where the probe is a USB device and the remote device is a USB host. Data flows between the USB device and the USB host through pipes, or logical channels, that terminate at endpoints of the USB device and memory buffers of the USB host. An endpoint is a uniquely addressable portion of a USB device that receives or transmits the information in a communication flow between the USB host and the USB device. Information flows between the USB host and the USB device in the form of packets. Packets are bundles of data organized in a group for transmission. In the method of FIG. 4, the probe may transmit (416) the digitized signal (422) by sending the digitized signal (422) as a USB packet from an endpoint of the probe to a memory buffer of the remote device through a pipe.

The method of FIG. 4 includes receiving (436) in the remote device through a data communications connection digitized signals captured and transmitted from two or more such synchronized probes. Continuing with the example from above where the data communications connection is implemented as a USB connection, the remote device may receive (436) the digitized signals from each synchronized probe in a memory buffer associated with a pipe that terminates at endpoints of each probe.

The description of the data communication connection used in transmitting (416) by the probe the digitized signals and receiving (436) in the remote device the digitized signal as a USB connection is for explanation only, and not for limitation. Other data communication connections may be used for acquiring test data from an electronic circuit as will occur to those of skill in the art. For example, the data communications connection between the remote device and the probe may be implemented using TCP and IP. In TCP parlance, the endpoint of a data communications connection is a data structure called a 'socket.' Two sockets form a data communications connection, and each socket includes a port number and a network address for the respective data connection endpoint. In the example of FIG. 4, the probe may transmit (416) the digitized signals as a TCP packet through a socket of the probe to a socket of the remote device. The remote device may then receive (436) the digitized signal at the port associated with the socket that received the TCP packet from the probe.

The method of FIG. 4 includes storing (440) the received signals (438) in a database (442) of the remote device. The received signals (438) represent data received by a remote device from a probe through a data communications connection. The received signals (438) may include, for example, the digitized signals (422) captured and transmitted from two or more such synchronized probes, the data stored in the digitized signal table (424), the data resulting from any data processing performed by a probe, or any other data received by a remote device from a probe through a data communications connection. In the method of FIG. 4, a remote device may be implemented as a remote storage device that includes database (422). Examples of remote storage devices may include a server, cluster of servers, nodes in a grid computing environment, and so on. After storing (440) the received signals (438) in a database (442) of the remote device, other devices, such as, for example, workstations, personal computers, servers, network devices, and so on, may access the received signal (438) stored in database (442) of the remote device for data processing.

Figure 5:
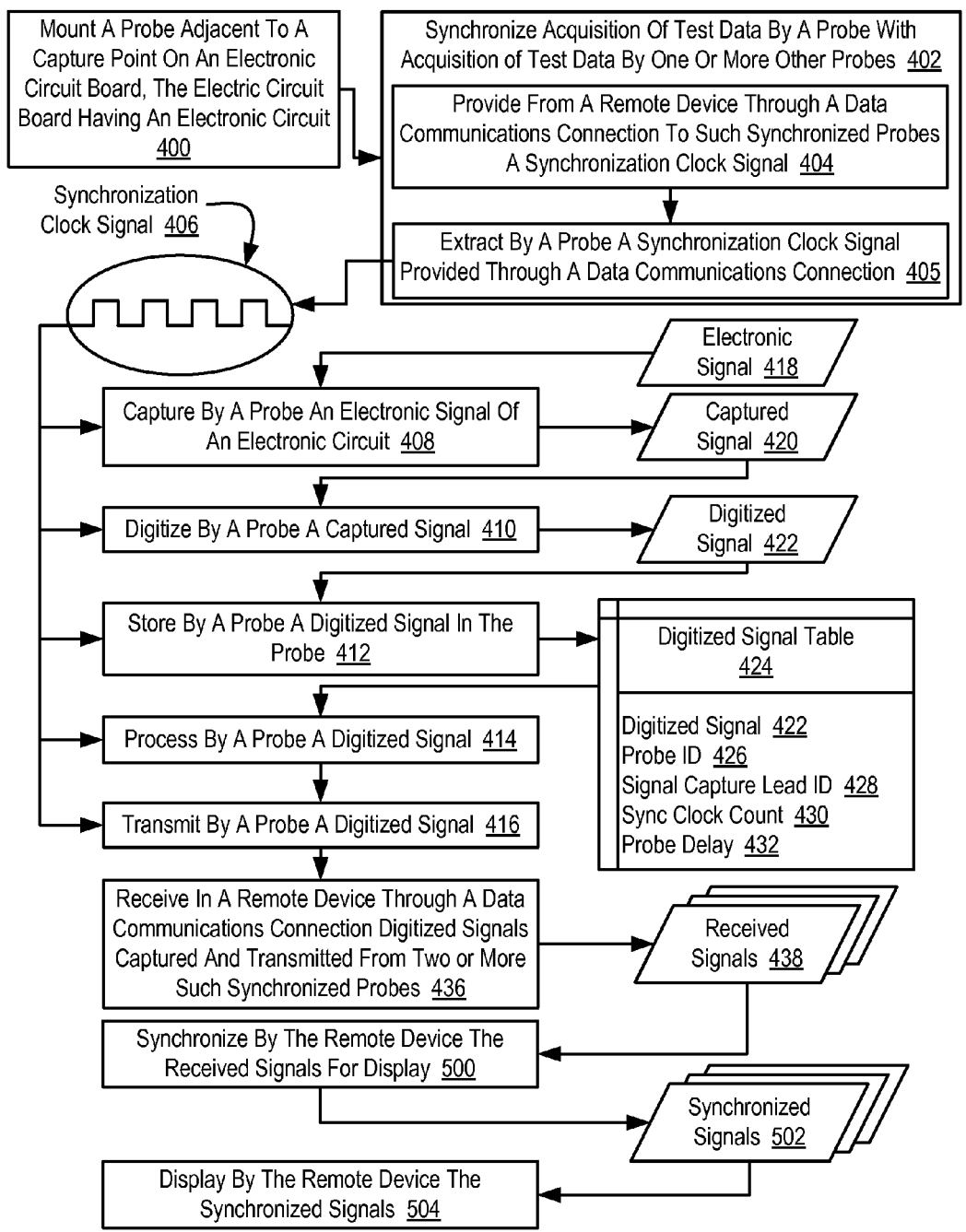
FIG. 5 sets forth a flow chart illustrating a further exemplary method for acquiring test data from an electronic circuit according to embodiments of the present invention.

For further explanation, FIG. 5 sets forth a flow chart illustrating a further exemplary method for acquiring test data from an electronic circuit according to embodiments of the present invention. The method of FIG. 5 includes mounting (400) a probe adjacent to a capture point on an electronic circuit board, the electronic circuit board having an electronic circuit, synchronizing (402) acquisition of test data by the probe with acquisition of test data by one or more other probes, including providing (404) from the remote device through a data communications connection to such synchronized probes a synchronization clock signal (406) and including extracting (405) by a probe a synchronization clock signal (406) provided through the data communications connection, capturing (408) by the probe an electronic signal (418) of the electronic circuit, digitizing (410) by the probe the captured signal (420), storing (412) by the probe the digitized signal (422) in the probe, processing (414) by the probe the digitized signal (422), transmitting (416) by the probe the digitized signal (422) from the probe through a data communications connection to a remote device, receiving (436) in the remote device through a data communications connection digitized signals captured and transmitted from two or more such synchronized probes—all of which operate in a similar manner and have a similar structure as described in the method of FIG. 4.

In addition, the method of FIG. 5 includes synchronizing (500) by the remote device the received signals (438) for display. A remote device may synchronize (500) the received signals (438) for display by adding the value of the probe delay (432) of each received signal (438) to a signal time of a received signal (438). The signal time of a received signal (438) is the value of the synchronization clock count (430) of a received signal (438) times the period of the clock pulses of the synchronization clock signal (406). For example, where the period of the clock pulses is 0.5 microseconds, the signal time for received signals (438) generated at various clock pulses of the synchronization clock signal (406) is calculated as follows:

$$T=S*Z$$

where T is the signal time of a received signal (438), S is the synchronization clock count (430) of a received signal (438), and Z is a the period of the clock pulses of the synchronization clock signal (406). In this example, the signal time for received signals (438) generated at the first clock pulse of the synchronization clock signal (406) is 0.5 microseconds, the signal time for received signals (438) generated at the second clock pulse of the synchronization clock signal (406) is 1.0 microseconds, the signal time for received signals (438) generated at the third clock pulse of the synchronization clock signal (406) is 1.5 microseconds, and so on.

The method of FIG. 5 also includes displaying (504) by the remote device the synchronized signals (502). A synchronized signal (502) is a received signal (438) with an adjusted signal time. An adjusted signal time is the signal time of a received signal (438) plus the probe delay (432) of the received signal (438). For example, where the remote device generates a synchronization clock signal (406) that includes a clock pulse every 0.5 microseconds and where a probe connected to the remote device through a data communications connection has a probe delay of 0.25 microseconds, the adjusted signal time for the received signals (438) from the probe generated at various clock pulses of the synchronization clock signal (406) is calculated as follows:

$$A=T+L=(S*Z)+L$$

where A is the adjusted signal time of a received signal (438), S is the synchronization clock count (430) of a received signal (438), Z is a the period of the clock pulses of the synchronization clock signal (406), and L is the probe delay (432) of a received signal (438). In this example, the adjusted signal time for received signals (438) from a probe with a probe delay of 0.25 microseconds generated at the first clock pulse of the synchronization clock signal (406) is 0.75 microseconds, the adjusted signal time for received signals (438) from a probe with a probe delay of 0.25 microseconds generated at the second clock pulse of the synchronization clock signal (406) is 1.25 microseconds, the adjusted signal time for received signals (438) from a probe with a probe delay of 0.25 microseconds generated at the third clock pulse of the synchronization clock signal (406) is 1.75 microseconds, and so on. A remote device may display (504) the synchronized signals (502) by arranging the synchronized signals (502) on a graphical user interface ('GUI') based on the adjusted signal time.

Figure 6:
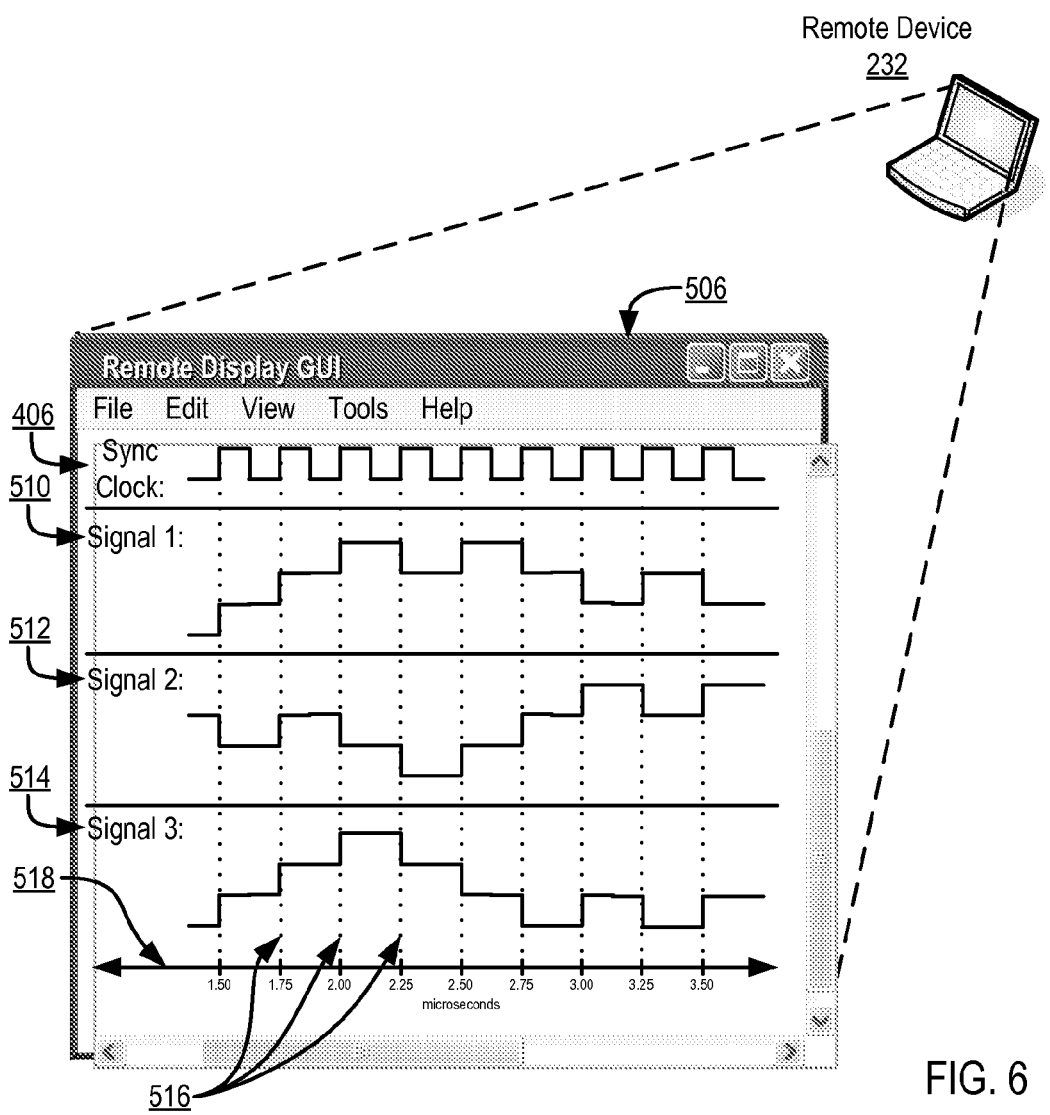
FIG. 6 sets forth a line drawing of an exemplary remote display graphical user interface ('GUI') of a remote device that supports acquiring test data from an electronic circuit according to embodiments of the present invention.

For further explanation, FIG. 6 sets forth a line drawing of an exemplary remote display GUI (506) of a remote device (232) that supports acquiring test data from an electronic circuit according to embodiments of the present invention. In the example of FIG. 6, the remote display GUI (506) includes synchronized signals (510, 512, and 514). The remote device (233) synchronizes synchronized signals (510, 512, and 514) based on an adjusted signal time. In the example of FIG. 6, the remote display GUI (506) also includes a horizontal time bar (518). The horizontal time bar (518) is a time scale based on adjusted signal times that provides the relationship in time of the value of each synchronized signal (510, 512, and 514) to the adjusted signal times.

In the example of FIG. 6, the remote display GUI (506) includes a synchronization clock signal (406). The synchronization clock signal (406) is a stream of clock pulses that provide a clock pulse to each synchronized probe at the same frequency. In the example of FIG. 6, the remote device (232) provides a synchronization clock signal (406) to allow all of the synchronized probes (510, 512, 514) to sample electronic signals with the same time interval between samples.

The remote display GUI (506) in the example of FIG. 6 includes vertical lines (516) to represent time intervals between samples. Each vertical line (516) represents a particular adjusted signal time. The values of the synchronized signal (510, 512, and 514) at each vertical line (516) occur at the same adjusted signal time. The remote device (232) may display the vertical lines (516) on remote display GUI (506) to show the relationship in time between synchronized signals (510, 512, and 514) and the synchronization clock signal (406).

Exemplary embodiments of the present invention are described largely in the context of a fully functional computer system for acquiring test data from an electronic circuit. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for acquiring test data from an electronic circuit, the system comprising:
   a probe mounted adjacent to a capture point on the electronic circuit board, the electronic circuit board having an electronic circuit, the probe having a computer processor and a computer memory operatively coupled to the computer processor, the computer memory having disposed within it computer program instructions capable of:
   capturing by the probe an electronic signal of the electronic circuit; digitizing by the probe the captured signal;
   transmitting by the probe the digitized signal from the probe through a data communications connection to a remote device; and
   synchronizing acquisition of test data by the probe with acquisition of test data by one or more other probes, including providing from the remote device through the data communications connection to such synchronized probes a synchronization clock signal.

2. The system of claim 1 further comprising computer program instructions capable of storing by the probe the digitized signal in the probe.

3. The system of claim 1 further comprising computer program instructions capable of processing by the probe the digitized signal.

4. The system of claim 1 wherein the remote device comprises a computer processor and a computer memory operatively coupled to the computer processor, the remote device computer memory having disposed within it computer program instructions capable of:
   receiving in the remote device through the data communications connection digitized signals captured and transmitted from two or more such synchronized probes;
   synchronizing by the remote device the received signals for display; and
   displaying by the remote device the synchronized signals.

5. A computer program product for acquiring test data from an electronic circuit, the computer program product comprising:
   a non-transmission, computer readable, recordable medium, the computer program product further comprising computer program instructions, disposed within the non-transmission, computer readable, recordable medium, capable of, when executed, of causing a computer to carry out the steps of:
   capturing by a probe mounted adjacent to a capture point on an electronic circuit board, the electronic circuit board having an electronic circuit, an electronic signal of the electronic circuit, wherein the probe comprises the computer program product;
   digitizing by the probe the captured signal;
   transmitting by the probe the digitized signal from the probe through a data communications connection to a remote device; and
   synchronizing acquisition of test data by the probe with acquisition of test data by one or more other probes, including providing from the remote device through the data communications connection to such synchronized probes a synchronization clock signal.

6. The computer program product of claim 5 further comprising computer program instructions capable of, when executed, of causing a computer to carry out the steps of storing by the probe the digitized signal in the probe.

7. The computer program product of claim 5 further comprising computer program instructions capable of, when executed, of causing a computer to carry out the steps of processing by the probe the digitized signal.

8. The computer program product of claim 5 further comprising computer program instructions capable of, when executed, of causing a computer to carry out the steps of:
   receiving in the remote device through the data communications connection digitized signals captured and transmitted from two or more such synchronized probes;
   synchronizing by the remote device the received signals for display; and
   displaying by the remote device the synchronized signals.

* * * * *